Sept. 23, 1941.  J. W. BEAMS ET AL  2,256,937

SUSPENSION OF ROTATABLE BODIES

Filed Dec. 17, 1938

Inventors:
Jesse W. Beams
Frederick T. Holmes
By Potter, Pierce & Scheffler
Attorneys Patented Sept. 23, 1941

2,256,937

UNITED STATES PATENT OFFICE 2,256,937

SUSPENSION OF ROTATABLE BODIES

Jesse W. Beams, Charlottesville, and Frederick T. Holmes, Proffit, Va., assignors to Research Corporation, New York, N. Y., a corporation of New York Application December 17, 1938, Serial No. 246,506

9 Claims. (Cl. 308—1)

This invention relates to means for suspending rotatable bodies, and in particular to means for suspending centrifugal rotors in a practically frictionless manner.

The suspension device of the invention comprises a metallic member mounted on the rotatable body and means positioned adjacent the metallic member providing a magnetic field reacting with the metallic member to produce a lifting force on the rotatable body. In general, it is desirable to provide means for controlling or modulating the strength of the magnetic field so as to provide a lifting force substantially equal to the weight of the rotating body, to maintain the rotating body in substantially constant position and to minimize or substantially eliminate frictional drag. Such control or modulation may be effected by a wide variety of means, including mechanical, electro-optical, electrical, and hydraulic means, as will be more particularly described hereinafter. Whether the lifting force resulting from the interaction of the magnetic field with the metallic member is equal to, less than or greater than the weight of the rotatable body will depend on the particular design adopted. In general, however, the frictional torque will be decreased as the lifting force approaches the weight of the rotatable body.

In the preferred form of the invention, which is directed to the suspension of bodies rotatable about a vertical axis, a magnetic, i. e., ferromagnetic, metallic member is mounted coaxially on the rotatable body, and there is positioned above the magnetic member means providing a magnetic field having a vertical axis of symmetry which extends coaxially of the rotatable body and reacting with the magnetic member to produce a lifting force on the rotatable body approximately equal to the weight thereof. However, the invention may be applied to bodies rotatable upon a horizontal axis in which case two magnetic fields are provided, spaced apart along the horizontal axis of the body, preferably in symmetrical relation with respect to the center of gravity thereof.

The metallic or magnetic member may be attached to a rotatable body formed of either non-metallic or metallic material and in the latter case the member may be integral with the body or provided by the body itself.

Various forms of centrifugal apparatus embodying the principles of this invention have been constructed, and exceedingly high rotational velocities with low frictional losses have been attained with them.

An object of this invention is to provide an apparatus for suspending horizontally rotatable bodies which utilizes the principles of magnetic attraction or repulsion to support the rotor.

Another object of this invention is to provide a centrifugal apparatus, including a magnetically supported rotor and means for impressing a driving torque thereon, which is capable of generating great centrifugal force with only a small energy input.

Another object of this invention is to furnish a centrifuge for the separation of liquid emulsions, suspensions, solutions, and the like, in which, because of the low retarding torque acting on the rotating member, but little heat is generated and objectionable convection currents, resulting in remixing of the centrifuged material, are thereby avoided. For the same reasons, accurate temperature control of the substance being centrifuged is rendered possible and substantially constant temperatures may be easily maintained in the separating rotor.

Another object of this invention is to provide a centrifugal apparatus of the type described in which the rotor may be spun at high and substantially constant velocity.

Other objects and advantages of this invention will be apparent from the following description and the accompanying drawing in which.

Figure 1:
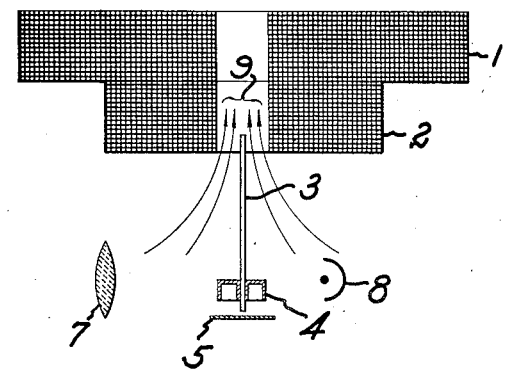
Fig. 1 is a diagrammatic sketch of one form of apparatus embodying the invention.

The invention will be described with reference to Fig. 1 which may be taken as exemplary of one modification. Solenoids 1 and 2, horizontally disposed and separately energized, are used for setting up magnetic field 9 about their common vertical axis of symmetry. The magnetic field converges as it approaches the solenoid system, reaches a zone of maximum strength at a point somewhere within the cylindrical opening through the center of the system, and thereafter diverges in similar manner. The rotatable member comprises shaft 3, of ferromagnetic steel or like magnetic substance, and vane 4 of aluminum or similar light alloy. Vane 4 is fitted on the shaft near one end so that the center of gravity of the rotatable member falls at a point removed from the center of the shaft in the direction of the vane. In operation, this rotatable member is suspended with the vane down. 5 is a damping plate, preferably of copper, to damp horizontal vibrations of the suspended member.

A source of light 6 is positioned with its center approximately on a level with the top of vane 4 when the rotatable member is in equilibrium suspension position. A lens 7 focuses a beam of light from the source 6 upon radiant energy sensitive element 8, preferably a photoelectric cell. Part of the beam of light is intercepted by vane 4, and the vertical position of the vane determines the amount of light striking the radiant energy sensitive element.

Figure 2:
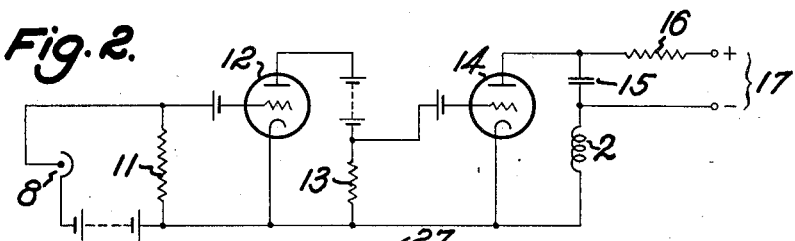
Fig. 2 is a diagrammatic sketch of an electrical circuit, including a radiant energy sensitive element, which regulates the amount of energy for supporting a magnetically suspended body.

Fig. 2 is a diagrammatic sketch of a two-stage D. C. amplifier for utilizing the small current generated in the radiant energy sensitive element 8 for modulating a current supply of sufficient magnitude to operate solenoid 2. 11 and 13 are fixed resistors. 12 and 14 are vacuum tubes. Condenser 15, across the power input 17, and resistor 16, in series therewith, effectively prevent oscillations of the supported rotatable body by damping surges and current variations in the circuit containing solenoid 2 so that sudden variations do not occur in the strength of the magnetic field set up by the solenoid. Hunting of the suspended member is thereby eliminated and vertical stability is insured.

Horizontal or lateral static stability of the suspended member is attained by keeping the ferromagnetic shaft 3 below the zone of most concentrated magnetic field. Due to convergence of the magnetic field upward toward the solenoid system 1—2, the vertical axis of greatest field strength is coaxial of the solenoid system, and the ferromagnetic shaft seeks a position coaxial thereof. Upon lateral displacement of the suspended member, a restoring force is set up which tends to realign the shaft with the center of the magnetic field. Lateral hunting may be largely eliminated by use of a suitable damping device, such as a disc 5 of a conducting metal, for example copper, horizontally disposed slightly below shaft 3 as shown in Fig. 1.

In operation, solenoid 1 is energized with a steady direct current to produce a magnetic field sufficiently strong to support a large fraction of the weight of the rotatable member. The source of light 6 is roughly focused on the upper edge of vane 4 so that a part of the light passes over the vane and strikes the photosensitive element 8. The current generated in the photosensitive element operates the two-stage D. C. amplifier shown in Fig. 2, whose output is fed into solenoid 2, the strength of which output is determined by the vertical position of vane 4 in the light beam. Thus, when the suspended member drops too low, the amount of light striking the photosensitive element is increased and the magnetic field is increased, resulting in an increased lifting force on the suspended body; when the suspended member rises too high the field is decreased, allowing the suspended member to drop back to its equilibrium position. In this way, with the adequate damping supplied, the suspended member is automatically maintained at its equilibrium position.

An electrical circuit, which would allow the bottom of the vane 4 to be used for intercepting the light beam, may be used with suitable means for inverting the phase of the current fed to solenoid 2, as called for by radiant energy sensitive element 8.

Instead of the electro-optical control system illustrated in Fig. 1, other control systems may be used. For example, the strength of the magnetic field may be controlled by the effect of the varying position of the suspended body or a member attached thereto, upon the capacity of a condenser positioned adjacent the suspended body and forming a part of the control circuit.

High rotational velocities have been attained with an apparatus of this type. With the driving magnet rotating at 1500 revolutions per second below the suspended member, stability of the latter was maintained up to 1200 revolutions per second, with no indication of incipient instability.

Using a small rotating member having a moment of inertia of 0.8 gram cm.$^2$, weighing about 6 grams, and spun in an exhausted chamber having a residual gas pressure estimated at $10^{-5}$ mm. Hg, damping observations with the driving magnet removed, at speeds in the neighborhood of 600 revolutions per second, showed the suspended rotor was decelerating at about $2\times10^{-3}$ revolutions per sec$^2$. This corresponds to a frictional torque of about $10^{-2}$ dyne cm., which, considering the weight and speed of the rotor, is believed to be at least one order of magnitude lower than that which has been achieved using other types of suspensions. In fact, in this form of the invention, there are apparently no theoretical lower limits for the frictional torque per unit angular velocity and the torsion constant.

Figure 3:
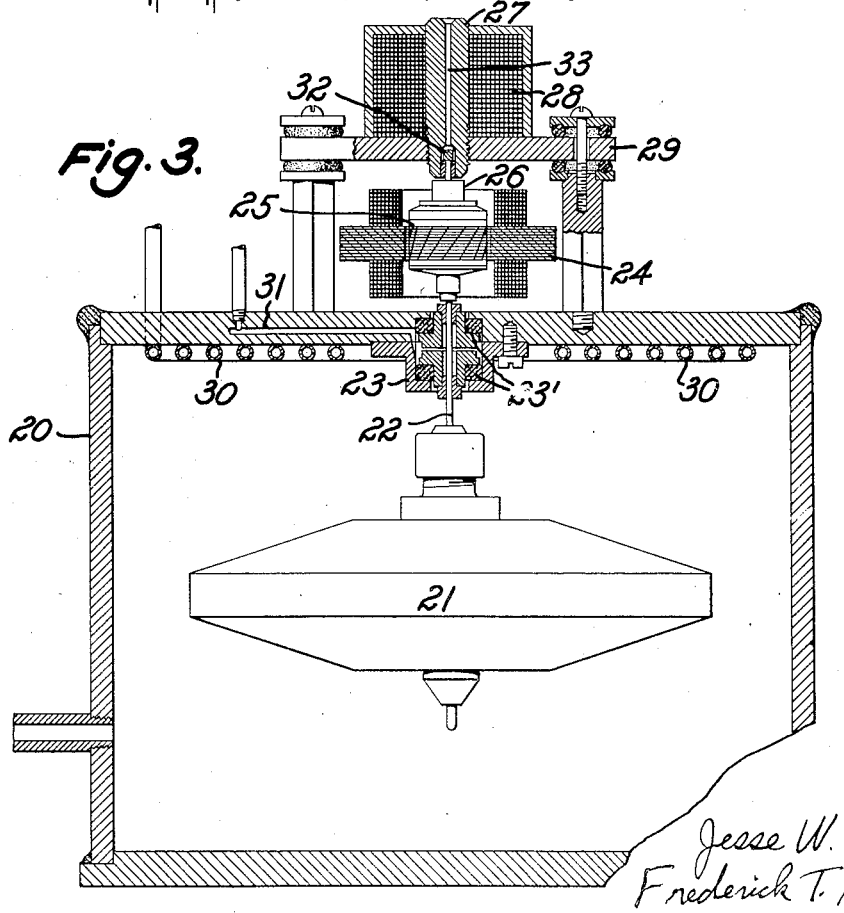
Fig. 3 is a sectional elevation, partly in perspective, of a vacuum centrifugal device embodying the principles of this invention and provided with an electrical drive.

Another modification of the present invention is embodied in the vacuum centrifuge shown in Fig. 3. The essential parts of this device are a centrifugal rotor, a driving means, electromagnetic rotor-suspending means, and a vacuum chamber. In this form of the invention the rotating body is maintained in operating position by the action of a magnetic field as in the form shown in Fig. 1, but the position is controlled by means of a stop bearing, the frictional resistance of which may be kept at a negligibly low figure by suitable adjustment or control of the magnetic field.

The rotating parts consist of the rotor or centrifuge 21, an armature 25 of an electrical motor, and a flexible steel shaft 22 which lies in their vertical axis of rotation and connects them together. The shaft 22 passes through a vacuum tight oil gland 23 which seals the vacuum chamber 20 surrounding the rotor. The oil gland is mounted in oil-resistant, flexible, round Duprene rings 23'. The rotating parts are supported by an electromagnet consisting of an iron core 27 and windings 28. The current through the windings is so adjusted that the magnetic attraction between the core and a small iron rod or magnetic member 26 rigidly attached to the rotor, is just greater than necessary to lift the rotating parts. Since the strongest portion of the magnetic field provided by the electromagnet is along the vertical axis of the windings 28 of the electromagnet, the magnetic field not only exerts a lifting force on the rotor but also exerts a force maintaining the axis of the rotor in alignment with the axis of the windings. The end of the shaft 22 fits into a bronze bushing and lightly presses against a bronze plug or stop 32 anchored in core 27.

The driving means for exerting a rotational torque on the suspended body for spinning the same comprises complementary motor elements, for example, an armature mounted on the rotatable body and field elements positioned in operative relation to the armature, and circuit elements for impressing a variable frequency pulsating current on one of said motor elements.

In the embodiment of Fig. 3, the armature 25 is of the squirrel cage type, and is mounted on shaft 22 which connects it to the rotor 21. The complementary field coils are shown at 24 and are positioned to be in operative relation to the armature when the rotatable body is suspended in running position. Small shading coils may be wound on the field so that the single phase induction motor will start from rest.

Circuits for impressing a variable frequency pulsating current upon the motor elements are well known to those skilled in the art, and any suitable circuit for accomplishing this purpose may be used. Preferably, a circuit for supplying alternating current to the field 24 comprises a variable frequency oscillator, controlled by a variable frequency piezoelectric crystal and a fixed frequency oscillator, controlled by a fixed frequency piezoelectric crystal, the two oscillators beating against each other to produce a beat frequency pulsating current, which after amplification is applied to the field coils of the motor. A micrometer adjustment may be provided for the variable frequency piezoelectric crystal so that the beat frequency produced may be varied from a few cycles to several thousand cycles per second.

To operate the centrifuge, vacuum pump oil is forced through duct 31 into gland 23, preferably by the hydrostatic pressure produced by mounting the oil supply well (not shown) above the gland. Water or oil at the temperature required is then circulated through copper coils 30 in good thermal contact with the upper plate of the chamber. For more complete temperature control, the walls and bottom of the vacuum chamber may also be provided with cooling coils. The vacuum chamber surrounding the rotor is then evacuated to a pressure of less than a micron. The core 27 of the electromagnet is next lowered to the proper position by screwing it into the flexibly mounted brass plate 29. A direct current which establishes a magnetic field large enough to lift the rotating parts and pull the end of the shaft 22 up against the bronze stop 32 in the core is then passed through windings 28. The clearance between the bottom of core 27 and the top iron rod 26 fastened to the armature is adjusted to approximately 0.2 mm. by adjusting the length of the rod 22 protruding above the magnetic member 26. The current in solenoid 28 is then reduced until the suspended member is just supported and the pressure of the top of shaft 22 on the bronze stop in core 27 is reduced to a very small value. This small pressure, aided by oil supplied from the top through channel 33, insures very low friction in the upper bearing. The pressure may be positively regulated at any predetermined limit by means of a solenoid regulating circuit controlled by a pressure responsive device, for example, a hydraulic chamber responsive to the pressure exerted on stop 32. When the pressure sensed by the pressure responsive device exceeds the predetermined limit the solenoid regulating circuit reduces the strength of the magnetic lifting field until the pressure is reduced to the desired figure.

Alternating current is then impressed across the field of the motor from the variable frequency power supply, the frequency of the current being increased gradually from about 100 cycles per second to a value somewhat greater than the rotational velocity required. The rate of frequency increase is adjusted, depending on the inertia of the body being rotated, so that maximum accelerating torque is applied. A certain slip exists between the rotational speed of the magnetically supported body and the frequency of the driving current, but this slip remains remarkably constant after equilibrium conditions have been attained. For example, a centrifuge of the type shown in Fig. 3 was spun at 1150 revolutions per second for several hours with a variation in speed of not more than two revolutions per second per hour. The slip was approximately 50 cycles per second.

Very high speeds may be attained, the speed of the rotating body being limited only by its mechanical strength. For a six inch Duralumin rotor as shown in Fig. 3, danger of bursting occurs above about 1200 revolutions per second and speeds in excess of this value may not safely be used.

As the centrifuge accelerates, it passes through natural vibration periods which are damped sufficiently by gland 23 to prevent trouble. The centrifuge preferably is operated at a speed well removed from the speeds where natural vibration takes place.

The electromagnetic driving means disclosed may be replaced by other driving means without losing the benefits of magnetic suspension. For example, a gas driven turbine, such as is shown in an article by J. W. Beams and E. G. Pickels, published in Review of Scientific Instruments, for October 1935, page 299 et seq., may be substituted for the electric motor shown in Fig. 3. The turbine may be driven by gas, steam, or other like fluid.

In this type turbine, a fluid under pressure is caused to impinge with a tangential component upon a turbine rotor. The fluid is directed against the rotor from a plurality of fixed jets mounted in a stator element in complementary relation to the rotor, which when attached to shaft 22 forms in effect an integral part of the suspended rotatable body.

We claim:

1. A high-speed centrifugal apparatus comprising a body rotatable about a vertical axis and having a ferromagnetic member mounted coaxially thereof and extending above the center of mass thereof, electromagnetic means positioned above said ferromagnetic member providing an upwardly converging magnetic field having a vertical axis of symmetry which extends coaxially of the rotatable body, said field reacting with said ferromagnetic member to produce a lifting force on said rotatable body, means exerting a rotational torque on said rotatable body, and means for varying the strength of said field in response to variations in the vertical position of the rotatable body.

2. A high-speed centrifugal apparatus comprising a body rotatable about a vertical axis and having a ferromagnetic member mounted coaxially thereof and extending above the center of mass thereof, electromagnetic means positioned above said ferromagnetic member providing an upwardly converging magnetic field having a vertical axis of symmetry which extends coaxially of the rotatable body, said field reacting with said ferromagnetic member to produce a lifting force on said rotatable body, means exerting a rotational torque on said rotatable body, circuit elements electrically connected with said electromagnetic means to provide an energizing circuit therefor, including a radiant energy sensitive element and means for varying the energy supply to said electromagnetic means with varying amounts of radiant energy impinging on said element, means directing radiant energy upon said sensitive element, and a member on said rotating body adapted to vary the amount of radiant energy impinging on said element with varying vertical position of the rotatable body.

3. In combination, a body rotatable about a vertical axis and means for supporting the same comprising a ferromagnetic member mounted on the rotatable body symmetrically with respect to the axis of rotation thereof, said axis of rotation passing through the mass of the ferromagnetic member, means positioned adjacent said ferromagnetic member providing a magnetic field symmetrical about said axis of rotation and reacting with said ferromagnetic member to produce a lifting force on said rotatable body, said magnetic field further reacting with said ferromagnetic member to set up a force tending to restore the coaxial alignment of said rotatable body and said magnetic field when the two are displaced from alignment, and means for varying the strength of said magnetic field in response to variations in the vertical position of the rotatable body.

4. In combination, a rotatable body and means for supporting the same comprising a ferromagnetic member mounted on the rotatable body symmetrically with respect to the axis of rotation thereof, said axis of rotation passing through the mass of the ferromagnetic member, electromagnetic means positioned adjacent said ferromagnetic member providing a magnetic field symmetrical about said axis of rotation and reacting with said ferromagnetic member to produce a lifting force on said rotatable body, said magnetic field further reacting with said ferromagnetic member to set up a force tending to restore the coaxial alignment of said rotatable body and said magnetic field when the two are displaced from alignment, circuit elements electrically connected with said electromagnetic means to provide an energizing circuit therefor, including a radiant energy sensitive element and means for varying the energy supply to said electromagnetic means with varying amounts of radiant energy impinging on said element, and means directing radiant energy upon said sensitive element, and a member on said rotating body adapted to vary the amount of radiant energy impinging on said element with varying vertical position of the rotatable obdy.

5. In combination, a body rotatable about a vertical axis and means for supporting the same comprising a substantially cylindrical ferromagnetic member mounted on the rotatable body coaxially with respect to the axis of rotation thereof and extending above the center of mass thereof, electromagnetic means positioned above said ferromagnetic member comprising a solenoid having a magnetic axis of symmetry coaxial with respect to the axis of rotation of said rotatable body and having an inside diameter greater than the outside diameter of said ferromagnetic member, said electromagnetic means providing at said ferromagnetic member an upwardly converging magnetic field symmetrical about said axis of rotation and reacting with said ferromagnetic member to produce a lifting force on said rotatable body substantially equal to the weight thereof and a force tending to restore the coaxial alignment of said rotatable body and said magnetic field when the two are displaced from alignment and means exerting a rotational torque on said rotatable body.

6. A high speed centrifugal apparatus comprising a body rotatable about a vertical axis and having a substantially cylindrical ferromagnetic member mounted thereon coaxially with respect to the axis of rotation thereof and extending above the center of mass thereof, electromagnetic means positioned above said ferromagnetic member comprising a solenoid having a magnetic axis of symmetry coaxial with respect to the axis of rotation of said rotatable body and having an inside diameter greater than the outside diameter of said ferromagnetic member, said electromagnetic means providing at said ferromagnetic member an upwardly converging magnetic field symmetrical about said axis of rotation and reacting with said ferromagnetic member to produce a lifting force on said rotatable body substantially equal to the weight thereof and a force tending to restore the coaxial alignment of said rotatable body and said magnetic field when the two are displaced from alignment and means exerting a rotational torque on said rotatable body.

7. A high speed centrifugal apparatus comprising a body rotatable about a vertical axis and having a substantially cylindrical ferromagnetic member mounted thereon coaxially with respect to the axis of rotation thereof and extending above the center of mass thereof, electromagnetic means positioned above said ferromagnetic member comprising a solenoid having a magnetic axis of symmetry coaxial with respect to the axis of rotation of said rotatable body and having an inside diameter greater than the outside diameter of said ferromagnetic member, said electromagnetic means providing at said ferromagnetic member an upwardly converging magnetic field symmetrical about said axis of rotation and reacting with said ferromagnetic member to produce a lifting force on said rotatable body substantially equal to the weight thereof and a force tending to restore the coaxial alignment of said rotatable body and said magnetic field when the two are displaced from alignment, means exerting a rotational torque on said rotatable body, and means for varying the strength of said magnetic field.

8. A high speed centrifugal apparatus comprising a body rotatable about a vertical axis and having a substantially cylindrical ferromagnetic member mounted thereon coaxially with respect to the axis of rotation thereof and extending above the center of mass thereof, electromagnetic means positioned above said ferromagnetic member comprising a solenoid having a magnetic axis of symmetry coaxial with respect to the axis of rotation of said rotatable body and having an inside diameter greater than the outside diameter of said ferromagnetic member and a core within said solenoid, said electromagnetic means providing at said ferromagnetic member an upwardly converging magnetic field symmetrical about said axis of rotation and reacting with said ferromagnetic member to produce a lifting force on said rotatable body substantially equal to the weight thereof and a force tending to restore the coaxial alignment of said rotatable body and said magnetic field when the two are displaced from alignment, means exerting a rotational torque on said rotatable body, and means for varying the strength of said magnetic field.

9. A high speed centrifugal apparatus comprising a body rotatable about a vertical axis and having a substantially cylindrical ferromagnetic member mounted thereon coaxially with respect to the axis of rotation thereof and above the center of mass thereof and electromagnetic means supporting the same comprising a cylindrical solenoid core positioned immediately above said ferromagnetic member and coaxially thereof, said core having a diameter greater than that of the ferromagnetic member, complementary thrust bearing elements mounted in said ferromagnetic member and in said core permitting rotation of said rotatable body, a solenoid encompassing said core and comprising therewith electromagnetic means providing at said ferromagnetic member an upwardly converging magnetic field symmetrical about said axis of rotation and reacting with said magnetic member to produce a lifting force on said rotatable body slightly greater than the weight thereof and a force tending to restore the coaxial alignment of said rotatable body and said magnetic field when the two are displaced from alignment, means exerting a rotational torque on said rotatable body and means for varying the strength of said magnetic field.

JESSE W. BEAMS.
FREDERICK T. HOLMES.